(12) United States Patent
MacNeil et al.

(10) Patent No.: US 10,011,207 B2
(45) Date of Patent: Jul. 3, 2018

(54) VEHICLE FLOOR MAT WITH WATERTIGHT CAPPED GROMMETS

(71) Applicant: MACNEIL IP LLC, Bolingbrook, IL (US)

(72) Inventors: David F. MacNeil, Hinsdale, IL (US); Allan R. Thom, Clarendon Hills, IL (US); Frederick W. Masanek, Jr., Barrington, IL (US)

(73) Assignee: MACNEIL IP LLC, Bolingbrook, IL (US)

( * ) Notice: Subject to any disclaimer, the term of this patent is extended or adjusted under 35 U.S.C. 154(b) by 106 days.

(21) Appl. No.: 15/332,668

(22) Filed: Oct. 24, 2016

(65) Prior Publication Data

US 2017/0036582 A1 Feb. 9, 2017

Related U.S. Application Data

(63) Continuation-in-part of application No. 14/874,193, filed on Oct. 2, 2015, now Pat. No. 9,610,880, which
(Continued)

(51) Int. Cl.
*B60N 3/04* (2006.01)
*B32B 3/26* (2006.01)
(Continued)

(52) U.S. Cl.
CPC .............. *B60N 3/046* (2013.01); *B32B 3/266* (2013.01); *B32B 3/30* (2013.01); *B32B 25/042* (2013.01);
(Continued)

(58) Field of Classification Search
CPC ............ Y10T 428/24008; B60N 3/046; B60N 3/048; B60N 3/044
(Continued)

(56) References Cited

U.S. PATENT DOCUMENTS 2,717,792 A 9/1955 Pelley
3,836,269 A 9/1974 Koscik
(Continued)

FOREIGN PATENT DOCUMENTS

DE 1952826 1/1967
DE 3240270 A1 5/1984
(Continued)

OTHER PUBLICATIONS cannoncarmats.com, Website, 4×4 Shape 1 Front Pair, product description, downloaded Sep. 22, 2008.

*Primary Examiner* — Alexander Thomas
(74) *Attorney, Agent, or Firm* — Perkins IP Law Group LLC; Jefferson Perkins (57) ABSTRACT

A mat for removable installation on the floor surface of a vehicle foot well has at least one through-hole for receiving a mat retention device. At least one endless elastomeric sealing member extends radially inwardly from a general sidewall surface of the through-hole. A grommet for the through-hole includes a bottom grommet and a cap. An outer sealing surface of the grommet compresses the elastomeric sealing member of the through-hole, thereby creating an impermeable barrier to water incident on an upper surface of the mat body. The mat body may have an endless ridge on its upper surface that is radially outwardly spaced from the through-hole and that is compressibly engaged by a lower surface of a cap retention flange.

21 Claims, 5 Drawing Sheets

Related U.S. Application Data is a continuation-in-part of application No. 14/812,663, filed on Jul. 29, 2015, now Pat. No. 9,517,712.

(51) Int. Cl.
  B32B 3/30 (2006.01)
  B32B 25/04 (2006.01)

(52) U.S. Cl.
  CPC ............ B60N 3/044 (2013.01); B60N 3/048 (2013.01); *B32B 2471/04* (2013.01); *B32B 2605/003* (2013.01)

(58) Field of Classification Search
  USPC .......................................................... 428/99
  See application file for complete search history.

(56) References Cited

U.S. PATENT DOCUMENTS

| | | |
|---|---|---|
| 4,041,241 A | 8/1977 | Olmstead |
| 4,280,729 A | 7/1981 | Morawski |
| 4,878,792 A | 11/1989 | Frano |
| 5,069,586 A | 12/1991 | Casey |
| 5,384,939 A | 1/1995 | Weber |
| 5,647,107 A | 7/1997 | Brewster |
| 5,775,859 A | 7/1998 | Anscher |
| 5,886,300 A | 3/1999 | Strickler |
| 6,357,090 B1 | 3/2002 | Murai |
| 6,381,806 B1 | 5/2002 | Stanesic et al. |
| 6,497,003 B2 | 12/2002 | Calabrese |
| 6,757,945 B2 | 7/2004 | Shibuya et al. |
| 7,546,661 B2 | 6/2009 | Connor, Jr. |
| D608,709 S | 1/2010 | Masanek, Jr. et al. |
| 7,945,992 B2 | 5/2011 | Parisi et al. |
| 8,080,302 B2 | 12/2011 | Gifford et al. |
| 8,402,605 B2 | 3/2013 | Courtin et al. |
| 8,757,698 B1 | 6/2014 | Rowland |
| 8,991,006 B2 | 3/2015 | Masanek, Jr. |
| 9,199,567 B1 | 12/2015 | Kaufman et al. |
| 2010/0122429 A1 | 5/2010 | Gonzalez et al. |

FOREIGN PATENT DOCUMENTS

| | | |
|---|---|---|
| DE | 9115861.3 U1 | 4/1992 |
| DE | 9300657.8 U1 | 4/1993 |
| DE | 4204410 A1 | 8/1993 |
| DE | 19805949 A1 | 8/1999 |
| DE | 20001405 U1 | 5/2000 |
| DE | 19617408 C2 | 2/2003 |
| EP | 1232070 B1 | 1/2005 |
| EP | 1980444 A2 | 10/2008 |
| FR | 1405310 | 5/1965 |
| FR | 92613 | 12/1968 |
| WO | 2011033482 A1 | 3/2011 |
| WO | 2012039058 A1 | 3/2012 |
| WO | 2012095823 A1 | 7/2012 |

VEHICLE FLOOR MAT WITH WATERTIGHT CAPPED GROMMETS

RELATED APPLICATIONS

This application is a continuation in part of pending U.S. patent application Ser. No. 14/874,193 filed Oct. 2, 2015, now U.S. Pat. No. 9,610,880 which in turn is a continuation in part of pending U.S. patent application Ser. No. 14/812,663 filed Jul. 29, 2015 now U.S. Pat. No. 9,517,712. These applications are owned by the Applicant and their specifications and drawings are fully incorporated by reference herein.

BACKGROUND OF THE INVENTION

It is known to provide mats and trays to protect the floor surfaces of vehicle foot wells. Where such a mat or tray (hereinafter generically referred to as a "mat") consists of or comprises a fluid-impermeable layer such as one made out of rubber or a thermoplastic polymer, the mat provides effective protection of the underlying surface from water and waterborne materials, such as snow, slush, grit, mud and various spilled foods and beverages. This is particularly desirable when, as is now common, the underlying vehicle foot well surface is carpeted.

Because the mat is not permanently affixed to the vehicle, it may have a tendency to slip about in the foot well. It is now common for vehicle manufacturers ("OEMs") to install mat retention devices at least in the driver's side foot well to prevent the displacement of the mat from where it is supposed to be. Even where the OEM does not furnish such mat retention devices, an aftermarket supplier of mats sometimes does. One such mat retention device can be seen in U.S. Pat. No. 9,199,567, assigned to the Applicant and incorporated by reference herein. A mat retention device usually will have a retention post that stands up from the foot well surface. It is common to receive these retention posts in holes made for them in the floor mats. But the creation of retention post holes in a floor mat breaches the fluid barrier and may permit fluid to leak onto the carpet through the hole. This problem becomes worse where the vehicle is subjected to winter or muddy conditions.

SUMMARY OF THE INVENTION

According to one aspect of the invention, a mat is provided to protect a vehicle floor surface from water and other fluids. The floor surface can be a vehicle foot well or another floor surface in the interior of the vehicle, such as a cargo area. The mat comprises a layer that is elastically deformable and water-impermeable. At least one through-hole is formed through the mat layer from its lower surface to its upper surface. At least one endless compressible sealing member is formed on the through-hole sidewall to extend radially inwardly toward the through-hole axis.

The mat further includes a grommet that includes a cap and a bottom grommet. Means are provided to affix the cap to the bottom grommet so as to capture the mat layer between them. One of the cap and the bottom grommet has an outer sealing surface that compresses the sealing member of the mat layer, such that the mat layer and the grommet form an impermeable barrier to fluid incident on the mat layer upper surface. In one embodiment, the outer sealing surface is provided by an outer surface of a cap sidewall. In one embodiment, the compressible sealing member is integrally formed with the mat layer, and the sealing member and mat layer may be elastomeric. The cap may have a web that extends completely across a top end of the cap sidewall, thereby defining a cap volume that is sealed from the region above the mat layer top surface. The cap may have a mat layer retention flange that radially outwardly extends from the cap sidewall and engages a top surface of the mat layer. The endless compressible sealing member may be convexly arcuate in axial cross section as viewed from the axis. In one embodiment, there are two or more such sealing members on a general surface of the sidewall through-hole, axially spaced apart from each other. In this manner, an impervious barrier is created against any water or other fluid incident on the top surface of the mat. The grommet further may have a mat retention post receiver, disposed radially interiorly of the bottom grommet sidewall, that is adapted to be removably affixed to a retention post or other structure upstanding from the vehicle floor surface to be protected.

In another aspect of the invention, a mat is provided that is adapted to be removably affixed to a vehicle floor surface. The body of the mat consists of or comprises a mat layer that is fluid-impermeable and that is made of an elastically deformable material. A through-hole is formed from an upper surface of the mat to a lower surface of the mat. The upper surface of the mat has formed thereon an endless upstanding ridge that is radially spaced from and surrounds the through-hole.

The mat further includes a grommet for the through-hole. The grommet includes a bottom and a cap. Means are provided for affixing the bottom grommet to the cap such that the mat layer is compressed between them. The cap has a sidewall that is formed around an axis of the through-hole and which extends downwardly from a top end of the sidewall. A web of the cap extends completely across the top end of the cap sidewall to seal the top end of the cap. A cap retention flange extends radially outwardly from the cap sidewall. A lower surface of the cap retention flange compresses the endless ridge formed in the top surface of the mat layer to form an impermeable barrier to fluid incident on the mat layer upper surface.

In one embodiment, a flat annular surface formed on the bottom of the cap retention flange engages and compresses the upstanding endless ridge on the mat layer upper surface. This flat annular surface may be disposed adjacent the outer edge of the flange.

In one embodiment, the mat layer is equipped with both an upstanding endless ridge as above described, and one or more elastically deformable sealing members located on the through-hole sidewall.

While the present invention has application to any mat that protects a floor surface, it is particularly advantageous when incorporated into a mat that has a large reservoir for rainwater, snowmelt and the like. In one embodiment, the through-hole is placed in the bottom of the reservoir and thus there is the very real possibility that water or other fluid will stand in the reservoir over the through-hole. The present invention ensures that none of this standing water will leak through the mat through-hole. Nonetheless, the through-hole and the grommet fitted to it may accept a mat retention device that stands up from the vehicle floor, thereby keeping the mat in one place. Retaining the mat in one place is particularly important in the front driver's side vehicle foot well.

BRIEF DESCRIPTION OF THE DRAWINGS

Further aspects of the invention and their advantages can be discerned in the following detailed description, in which like characters denote like parts and in which.

DETAILED DESCRIPTION

Figure 1:
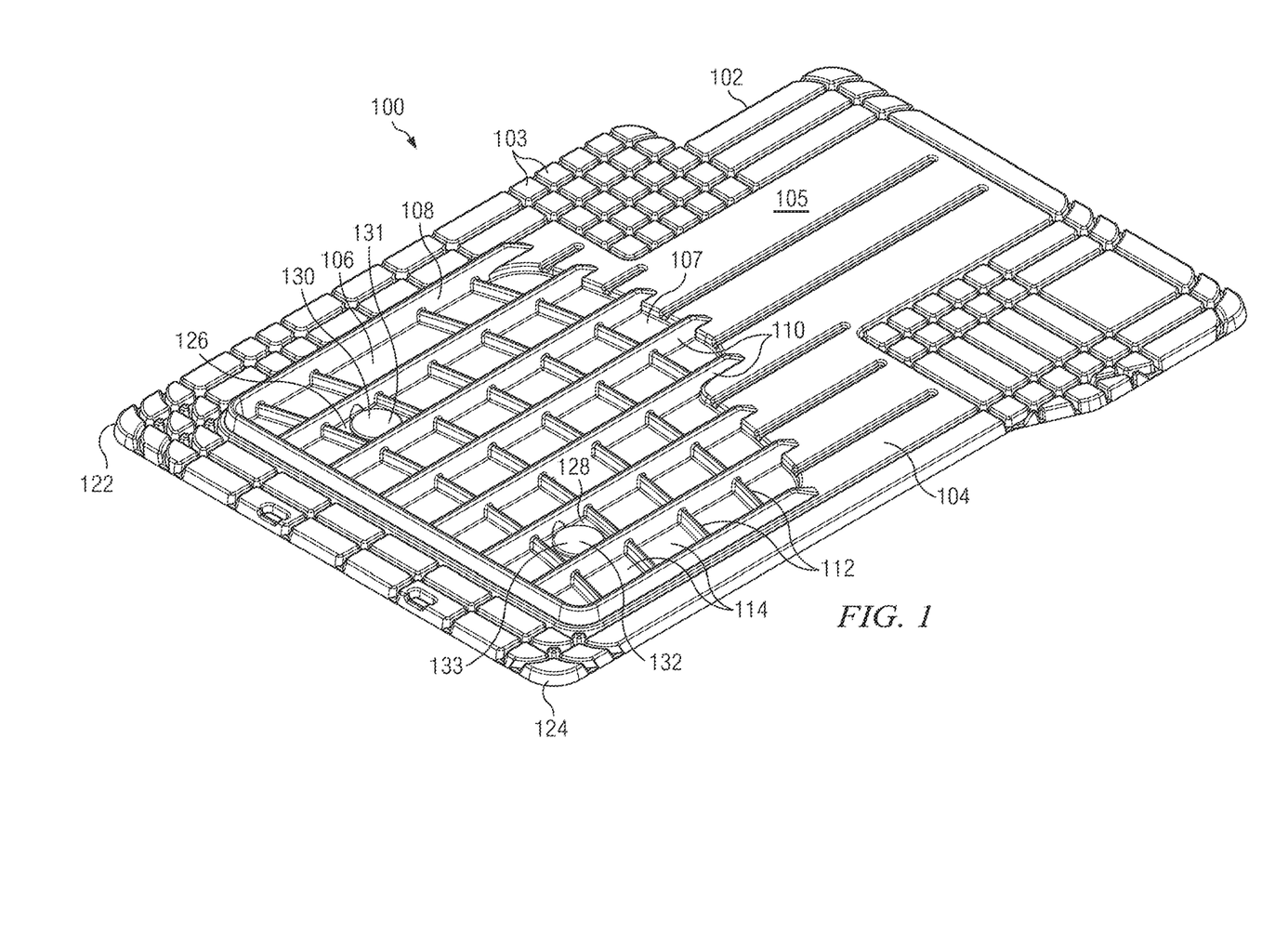
FIG. 1 is perspective view of a mat according to the invention.

As seen in FIG. 1, a representative vehicle foot well floor mat 100 consists of or comprises a mat layer 102. The mat layer 102 is formed of an elastically deformable material that presents an impermeable barrier to fluids such as rainwater, snowmelt, mud, oils, foods and beverages and particulates borne by these fluids, such as sand, clay and dirt. Mat 100 may be a cut-to-fit mat with a plurality of cells 103, as shown, or alternatively may be a custom-fit mat, or a more three-dimensional floor tray. The illustrated mat 100 is meant for affixation in a driver's side vehicle foot well with the use of at least one vehicle floor mat retention device (later described), but the invention has application to any mat or cover which is attached by at least one affixation device to a surface to be protected, and which has a fluid-impermeable barrier. Hence, mats according to the invention also include passenger's side mats, second- or third-row mats, cargo liners and trunk liners. In one embodiment the mat layer 102 is molded or thermoformed from an elastomeric compound such as rubber or thermoplastic elastomer (TPE).

FIG. 1 shows an upper surface 104 of mat layer 102. In the illustrated embodiment, the upper surface 104 includes a general upper surface 105, and, adjacent to it, a reservoir 106. A bottom 107 of the reservoir 106 is lower than the general upper surface 105. Snowmelt, water and the like that are dropped on the general upper surface 105 will have a tendency to pool and to flow into the reservoir 106. The reservoir 106 is surrounded on three sides by a prominent perimeter rib 108 that further increases the effective depth of the reservoir 106. The reservoir volume is divided into cells 114 by spaced-apart longitudinal ribs 110 and spaced-apart transverse ribs 112; ribs 110 may be chosen to be taller than ribs 112 in a tiered arrangement. Cells 114 inhibit the collected water from sloshing about. A typical mat 100 has a basic mat thickness of 0.250 to 0.500 inches and can be 0.375 inches. In one embodiment the perimeter rib 108 is 0.250 inches to 0.750 inches high and can have a height of 0.5 inches, resulting in an overall mat thickness of 0.875 inches. The fore and aft or longitudinal ribs 110 can be at a lower height than that of the perimeter rib 108. This height can be 0.125 inches to 0.625 inches and can be 0.375 inches above the elevation of general upper surface 105. The transverse ribs 112 can be at a lower height than the longitudinal ribs 110. This height can be between −0.125 to +0.500 inches relative to the height of the longitudinal ribs 110 and can have a height of 0.06 inches above upper mat surface 105. While the aggressive ribbing 108, 110, 112 allows for the trapping of more melt water and the like, the greater water collection also makes sealing this top mat surface 104 from the OEM carpet a more critical issue. One does not want to trap a gallon of water in the reservoir 106 only to have it leak out onto the carpet underneath the mat.

The depth of the reservoir 106 and its partition into cells 114 by ribs 110, 112 also increases the likelihood that water will stand in any of the cells 114 for a longer period of time prior to evaporation, increasing the danger that such water will leak through any hole made in the mat layer 102. It therefore becomes more important to make sure that there is no such leak.

The illustrated mat 100 is equipped with two grommeted through-holes (later described), one near a left aft corner 122 and one near a right aft corner 124. The through-holes are positioned in the bottom of respective reservoir cells 126 and 128. A grommet cap 130 is seen in cell 126, while an identical grommet cap 132 is seen in cell 128. Grommet cap 130 is a portion of a left grommet 131, while grommet cap 132 is a portion of a right grommet 133.

Figure 2:
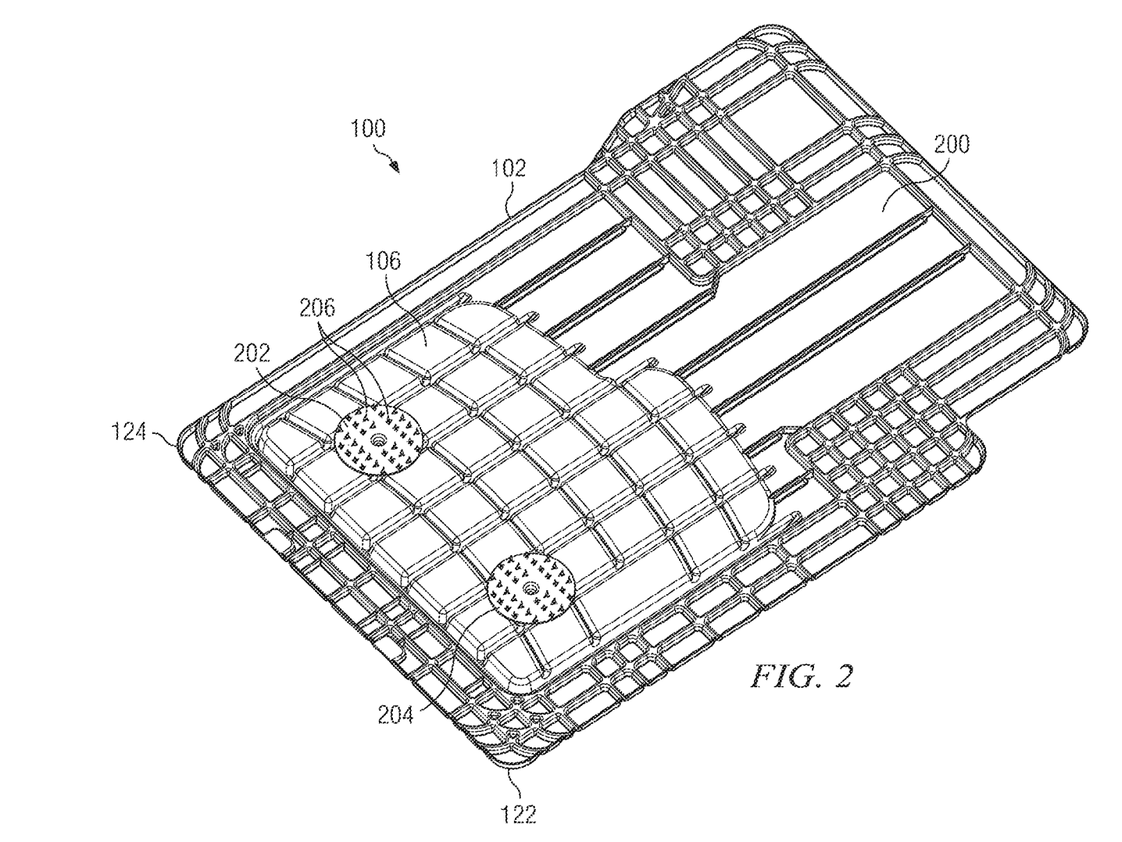
FIG. 2 is a bottom perspective view of the mat shown in FIG. 1.

A lower surface 200 of the mat layer 102 is seen in FIG. 2. In the illustrated embodiment, aftermarket-supplied vehicle floor cover retention devices 202, 204 have been pre-fitted to the mat grommets (described below). In the illustrated embodiment, the retention devices 202, 204 are furnished with spikes 206 that engage the carpet pile. Other forms of retention devices may be used instead, and these may even be supplied by the original equipment manufacturers (OEMs) and may stick up from the carpeted foot well surface. The spikes 206 are generally triangular pyramidal shapes ending in a point that provides a means for gripping the vehicle carpet. Some OEM or aftermarket retention devices (not shown) are designed to be adhered to foot wells with vinyl or other smooth lower surfaces.

Figure 3:
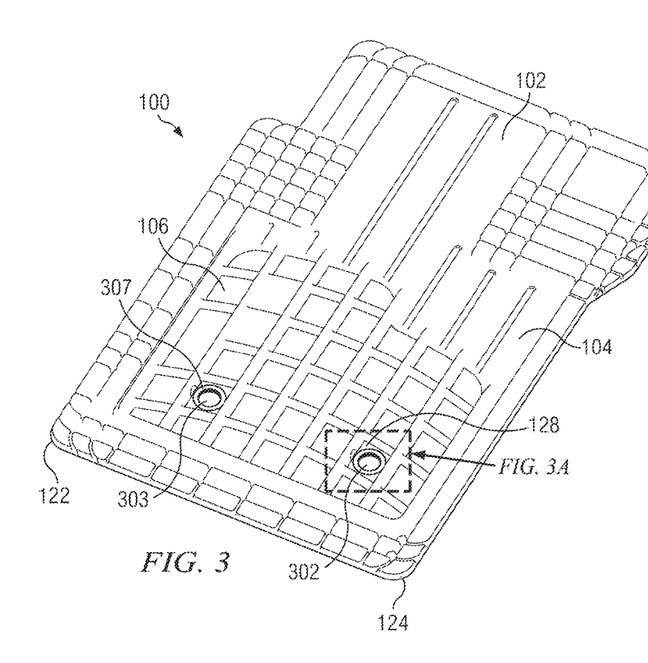
FIG. 3 is a perspective view of the mat shown in FIG. 1 prior to the installation of grommets in respective through-holes.
Figure 3A:
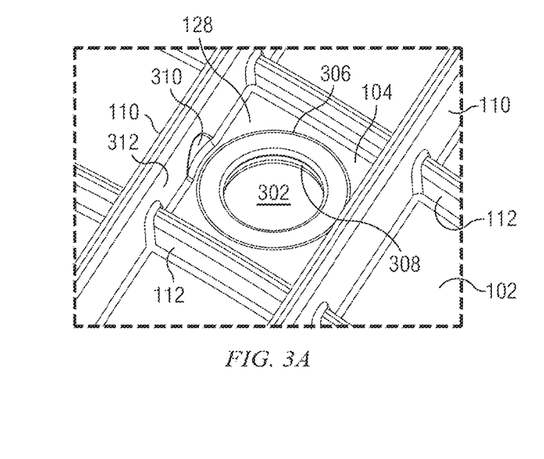
FIG. 3A is a magnified detail of FIG. 3, showing a through-hole and surrounding structure.

FIG. 3 shows the upper surface 104 of the mat 100 prior to the installation of the grommets, and FIG. 3A is a detail of one cell 128 shown in FIG. 3. The mat 100 has at least one through-hole 302 (shown magnified in FIG. 3A) formed in the mat layer 102. Usually there are two such through-holes 302, 303 laterally spaced-apart, respectively and typically located near the aft outboard and aft inboard corners 122, 124 of the foot well and floor cover, as shown in FIG. 3.

Taking through-hole 302 as an example, the entirety of the through-hole 302 is covered by the cap 132 and more particularly a web 304 of it. An upstanding endless ridge 306 on the upper surface 104 is radially outwardly spaced from a hole margin 308 of through-hole 302. This raised ridge 306, if present, provides a circumferential seal with a lower surface (later described) of the grommet cap 132. Ridge 306 can have a convex upper surface. Through-hole 303 has an identical endless ridge 307 (FIG. 3) that is spaced from through-hole 303 and laterally surrounds it.

In one embodiment a conical carve-out 310 in each hole-facing sidewall 312 of the pair of longitudinal ribs 110 defining cell 128 permits the cap 132 to be moved down all the way to meet the upper surface 104 so as to seal tightly against the upper surface 104. Depending on the diameter of cap 132 and the spacing apart of transverse ribs 112, similar carve-outs may occur on the hole-facing sidewalls of the transverse ribs 112. Carve-outs 310 would not be needed in embodiments where longitudinal ribs 110 are spaced further apart, or where the through-holes 302, 303 and their associated caps 130, 132 have relatively smaller diameters.

Figure 3B:
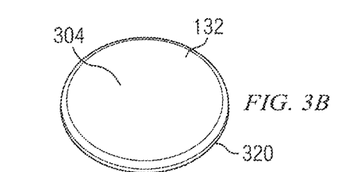
FIG. 3B is a top perspective view of a grommet cap for use with the invention.
Figure 3C:
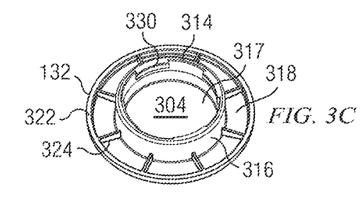
FIG. 3C is a bottom perspective view of the cap shown in FIG. 3B.

FIGS. 3B and 3C show an enlarged perspective view of the lower and upper sides of a representative grommet cap 132. The cap 132 has a downwardly depending (in FIG. 3C, upwardly extending) circumferential sidewall 314 that has a substantially cylindrical outer surface 316. The sidewall 314 is joined at its top end to web 304, so as to define a sealed cap volume 317. A flange 318 of the cap 132 radially outwardly extends from the sidewall 314 to a circular margin 320. An annular lower surface 322 of flange 318 adjoins the margin 320. While in this embodiment the flat surface 322 is an annulus, in other embodiments the flat surface 322 can occupy the entire underside of flange 318. Where flat surface 322 is annular, spaced-apart radiating ribs 324 may join dependent annulus 322 to the sidewall 314.

An interior surface 326 of the cap sidewall 314 may terminate in a latch or enlarged bead 328, which may be segmented into bead sections 330.

Figure 4:
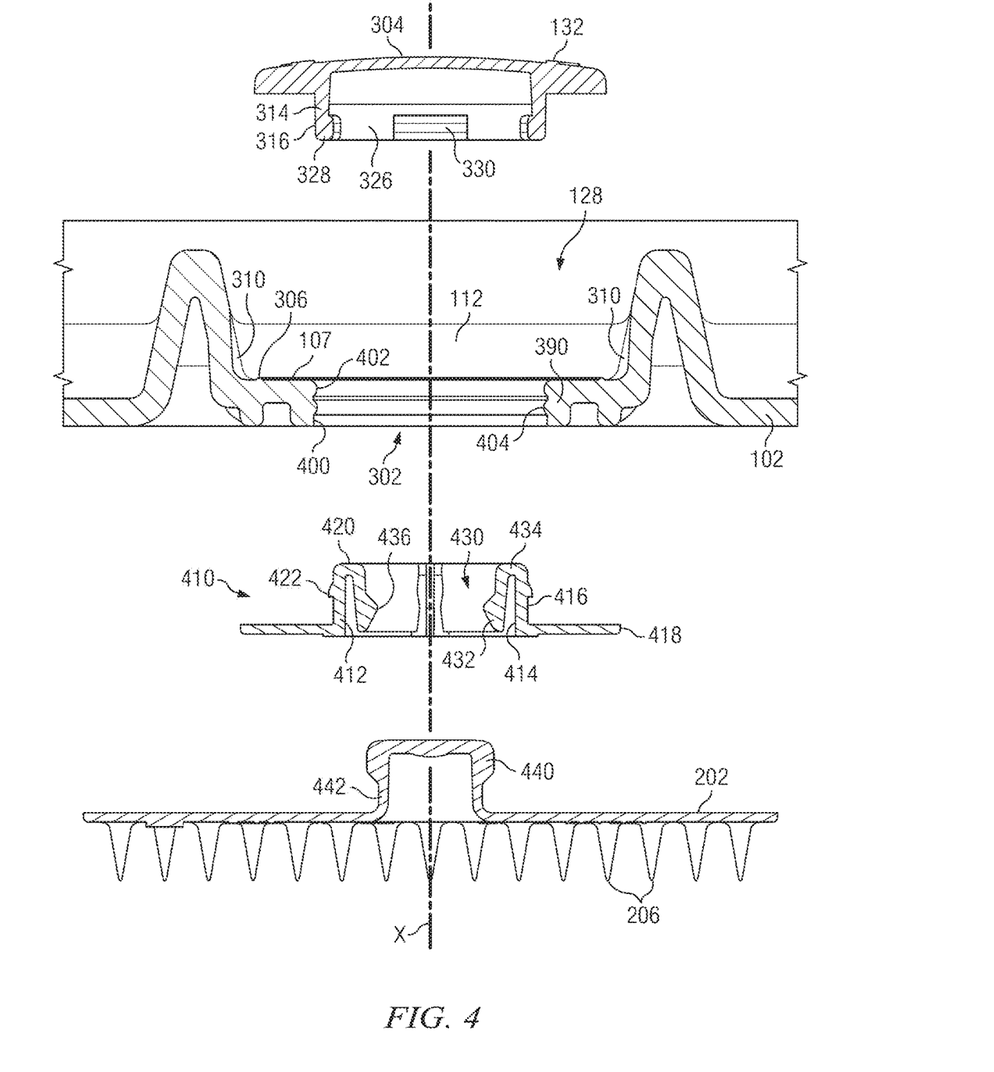
FIG. 4 is an exploded axial sectional view of a grommet cap, floor mat body and bottom grommet according to the invention, together with a representative vehicle floor mat retention device.

Referring to FIG. 4, an interior or general surface or sidewall 400 of the through-hole 302 has at least one endless compressible sealing member or o-ring structure 402 that extends radially inwardly toward the through-hole axis from a general surface 400 of a through-hole sidewall 390. The sealing member 402 is integrally molded with the rest of mat layer 102 of an elastomeric material and thus has elastomeric properties. The sealing member 402 can take the form of an inner half of an o-ring or a hemitoroid, as shown; in axial section, member 402 is semicircular. In the illustrated embodiment, a second endless compressible sealing member 404 likewise projects radially inwardly toward the through-hole axis from the general sidewall surface 400. The second sealing member 404 is downwardly spaced from the first sealing member 402. Second sealing member 404 can be integrally molded with mat layer 102 out of an elastomeric material and may be a hemitoroid, as shown. In other embodiments, other sealing members (not shown) could be added to the through-hole sidewall surface 400, which could be axially extended for this purpose.

A bottom grommet 410 may be integrally molded from a polymeric material, such as Nylon, Polypropylene, ABS or other suitable material. The bottom grommet 410 has an outer sidewall 412 with an inner surface 414 and an outer surface 416. A bottom grommet retention flange 418 extends radially outwardly from the outer surface 416 of the outer sidewall 412. The flange 418 engages the bottom surface 200 of the mat layer 102. The outer sidewall 412 extends upwardly from the flange 418 at least to a top plane 420. Means are provided to fasten the bottom grommet 410 to the cap 132. Such means can include a circumferential flange 422 that projects radially outwardly from the rest of sidewall surface 416. The latch 328 of the cap 132 snaps over the flange 328 to fasten the cap 132 to the bottom grommet 410. Alternative means include male and female helical threads or channels whereby the cap 132 is first pushed down relative to grommet 410 and then turned.

The bottom grommet 410 includes a means 430 for releasably affixing or attaching to a retention post. This means or retention post receiver 430 can take any of several forms. The retention post receiver 430 preferably is integrally molded with the rest of bottom grommet 410 and is attached to it either at top plane 420 or along inner surface 414 of outer sidewall 412. In general, the post receiver 430 can be disposed radially interiorly of the outer sidewall 412. In the illustrated embodiment, the post receiver 430 comprises a plurality of angularly spaced-apart fingers 432 that are disposed around through-hole and grommet axis X, and are joined to the outer sidewall 412 at top plane 420 by their respective upper ends 434. In this embodiment there are six fingers 432 but other embodiments may have more or less fingers 432 and the fingers 432 may differ in angular width.

Each finger 432 terminates in an enlarged bead 436. In the illustrated embodiment, the fingers 432 outwardly flex as they receive an enlarged or "mushroom" head 440 of retention device 202. The inner surface of beads 436 cam over an outer surface 438 of the head 440. More generally, the retention device 202 will have an upstanding post 442, here terminating in an enlarged head 440. Other vehicle retention posts may take other forms and the retention post receiver 430 may be altered to releasably attach to them.

Figure 5:
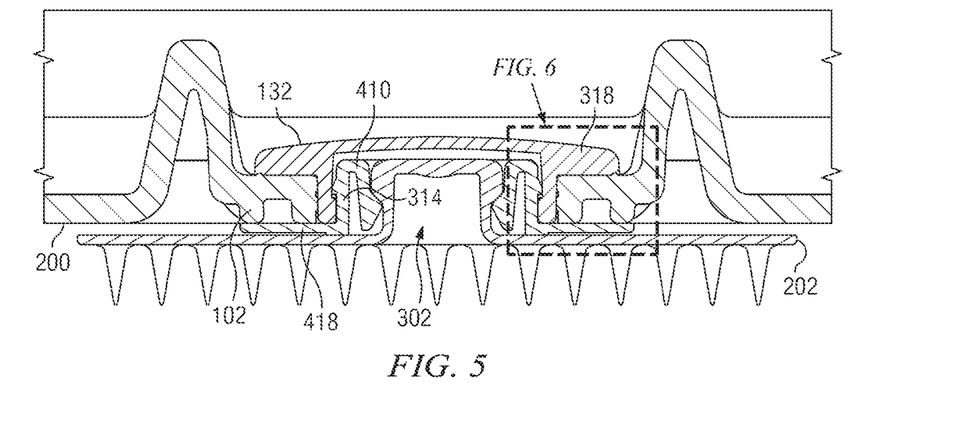
FIG. 5 is an assembled axial sectional view of the grommet cap, floor mat body, bottom grommet and vehicle floor mat retention device shown in FIG. 4.
Figure 6:
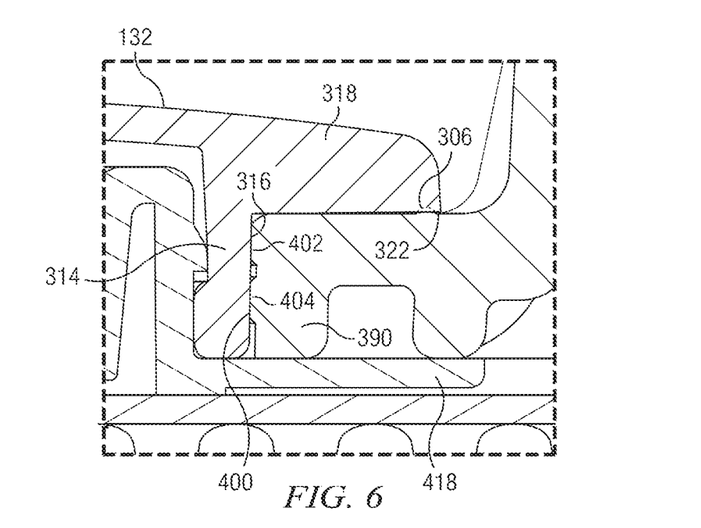
FIG. 6 is a magnified detail of FIG. 5.

FIG. 5 shows cap 132 and bottom grommet 410 assembled so as to seal through-hole 302, and shows the bottom grommet 410 engaged with retention device 202. FIG. 6 is a detail of this. As assembled, the floor mat body 102 is compressed between bottom grommet retention flange 418 and cap flange 318, and cap sidewall 314 is received in an interference fit into through-hole 302. In this condition, the grommet cap 132 seals to the mat body 102 in three places. First, upstanding ridge 306 deformably compresses against lower cap flange surface 322, forming a face seal. Second, through-hole sealing member 402 deformably compresses against outer surface 316 of cap sidewall 314. Third, through-hole sealing member 404 deformably compresses against outer surface 316 of cap sidewall 314. In an alternative embodiment (not shown), bottom grommet sidewall 412 could be disposed to the exterior of cap sidewall 314, an inner surface of the bottom grommet sidewall would snap or otherwise fasten to an exterior surface of the cap sidewall, and an outer surface of the bottom grommet sidewall would create a compression seal with sealing members 402 and/or 404.

Should water or other liquid settle on the mat upper surface 104 (and in particular on the bottom 107 of a reservoir cell 136 or 128), it will be contained in the walled volume between the transverse ribs 118 and the longitudinal ribs 120 until it evaporates or is otherwise disposed of. There are at least two barriers formed to prevent the water from seeping through the mat. One level of seal is provided by the face seal between the upstanding endless ridge 306 meeting the flange surface 322 of the grommet cap. Another level of seal is formed by at least one o-ring 402 or both o-rings 402, 404 meeting the outer sidewall surface 316 of the grommet cap 132.

In summary, a mat for protecting a vehicle floor surface from water is provided. The mat has at least one through-hole that is sealed by a cap and forms a water-impermeable barrier so that water is captured by the mat surface and does not flow onto the vehicle floor.

While illustrated embodiments of the present invention have been described and illustrated in the appended drawings, the present invention is not limited thereto but only by the scope and spirit of the appended claims.

We claim:

1. A mat for removable placement on a floor surface of a vehicle and adapted to protect the floor surface from fluids, the mat comprising:
 a mat body having at least a mat layer composed of an elastically deformable material, the mat layer having a lower surface and an upper surface opposed to the lower surface, the mat layer forming a fluid-impermeable barrier;
 at least one through-hole formed in the mat layer on an axis to extend from the upper surface to the lower surface, the through-hole having a sidewall, at least one endless compressible sealing member formed on the sidewall to extend radially inwardly toward the axis; and
 a grommet including a cap and a bottom grommet, means for affixing the cap to the bottom grommet so as to capture the mat layer therebetween, one of the cap and the bottom grommet having an outer sealing surface that compresses the sealing member of the mat layer, such that the mat layer and the grommet form an impermeable barrier to fluid incident on the mat layer upper surface.

2. The mat of claim 1, wherein the sidewall of the through-hole has a general surface, the endless compressible sealing member of the through-hole sidewall extending radially inwardly from the through-hole sidewall general surface.

3. The mat of claim 2, wherein said at least one endless compressible sealing member is one of a plurality of endless compressible sealing members extending radially inwardly from the through-hole sidewall general surface, the compressible sealing members being axially spaced apart from each other.

4. The mat of claim 1, wherein the endless compressible sealing member is integrally molded as part of the mat layer.

5. The mat of claim 4, wherein the bottom grommet further comprises a mat retention post receiver disposed radially inwardly of the bottom grommet sidewall.

6. The mat of claim 1, wherein the bottom grommet has a sidewall with an outer surface, a bottom grommet retention flange joined to the bottom grommet sidewall and radially outwardly extending from the outer surface of the bottom grommet sidewall to engage the bottom surface of the mat layer, the bottom grommet sidewall extending axially upwardly from the bottom grommet retention flange.

7. The mat of claim 6, wherein the mat retention post receiver comprises a plurality of resilient fingers connected to and disposed radially inwardly from the bottom grommet sidewall, the fingers arranged around the axis.

8. The mat of claim 1, wherein the cap has a cap sidewall formed around the axis and has a top end, the cap sidewall downwardly extending from the top end, said outer sealing surface formed by an outer surface of the cap sidewall.

9. The mat of claim 1, wherein the cap has a cap sidewall formed around the axis, the cap sidewall having an outer surface and a top end, a web of the cap extending completely across the top end of the cap sidewall, a volume of the cap defined by the web of the cap and the cap sidewall, the web sealing the cap volume, a cap retention flange extending radially outwardly from the outer surface of the cap sidewall and engaging the top surface of the mat layer.

10. The mat of claim 1, wherein the endless compressible sealing member has a semicircular axial cross-section.

11. The mat of claim 1, wherein an upstanding endless ridge is formed on the top surface of the mat layer to be radially spaced from and to surround the through-hole, the cap having a top end and a sidewall downwardly depending from the top end, the cap sidewall having an outer surface, a cap retention flange extending radially outwardly from the cap sidewall outer surface, a lower surface of the cap retention flange compressing the ridge to effect a seal between the cap and the mat layer.

12. The mat of claim 1, wherein a second through-hole is formed through the mat body at a location spaced from the through-hole, the second through-hole equipped with a second grommet similar to said grommet so as to present an impermeable barrier to fluid incident on the top surface of the mat layer.

13. The mat of claim 1, wherein the means for affixing the cap to the bottom grommet includes a bottom grommet sidewall with an outer surface, a bottom grommet engagement ridge formed at an angle to the axis and to extend radially outwardly from the outer surface of the bottom grommet sidewall, the cap having a sidewall disposed radially outwardly from the bottom grommet sidewall and having an inner surface, a latch radially inwardly extending from the inner surface of the cap sidewall, the latch engaging the engagement ridge of the bottom grommet sidewall.

14. The mat of claim 1, wherein the entirety of the mat body is made up of the mat layer.

15. The mat of claim 1, wherein the top surface of the mat layer comprises a general top surface and a reservoir disposed laterally adjacent the general top surface, a bottom of the reservoir disposed below the general top surface of the mat layer, the through-hole formed in the bottom of the reservoir.

16. A mat for removable placement on a floor surface of a vehicle and adapted to protect the floor surface from fluids, the mat comprising:
 a mat body having at least a mat layer composed of an elastically deformable material, the mat layer having a lower surface and an upper surface opposed to the lower surface, the mat layer forming a fluid-impermeable barrier;
 at least one through-hole formed in the mat layer on an axis to extend from the upper surface to the lower surface, an upstanding endless ridge of the mat layer formed on the upper surface of the mat layer to be radially spaced from and surround the through-hole;
 a grommet comprising a bottom grommet and a cap, means for affixing the bottom grommet to the cap such that the mat layer is compressed between the bottom grommet and the cap; and
 the cap having a cap sidewall formed around the axis, having a top end and an outer surface, the cap sidewall downwardly extending from the top end, the cap including a web that extends completely across the top end of the cap sidewall to seal the top end of the cap, a cap retention flange extending radially outwardly from the outer surface of the cap sidewall and engaging the top surface of the mat layer, a lower surface of the cap retention flange compressing the endless ridge of the mat layer to effect a seal therebetween, such that the mat layer and the cap form an impermeable barrier to fluid incident on the mat layer upper surface.

17. The mat of claim 15, wherein the cap retention flange has an outer margin, a flat annulus of the lower surface of the cap retention flange disposed adjacent the outer margin and making sealing engagement with the endless ridge of the mat layer.

18. The mat of claim 15, wherein a second through-hole is formed through the mat body at a location spaced from the through-hole, a second upstanding endless ridge of the mat layer formed on the upper surface of the mat layer to be radially spaced from and laterally surround the second through-hole, a second cap disposed in the second through-hole, a lower surface of a retention flange of the second cap compressing the second endless ridge to present an impermeable barrier to water incident on the top surface of the mat layer.

19. The mat of claim 15, wherein the elastically deformable material comprises an elastomer.

20. The mat of claim 15, wherein the endless ridge is upwardly convexly arcuate in axial section.

21. The mat of claim 15, wherein the endless ridge is integrally formed with the mat layer.

* * * * *